United States Patent [19]

Sailas

[11] 4,112,565
[45] Sep. 12, 1978

[54] METHOD OF MAKING STRIP-COVERED ROLL

[75] Inventor: Väinö Sailas, Vaajakoski, Finland

[73] Assignee: Valmet Oy, Finland

[21] Appl. No.: 811,136

[22] Filed: Jun. 28, 1977

[30] Foreign Application Priority Data

Jun. 30, 1976 [FI] Finland .................................. 761903

[51] Int. Cl.² ....................... B21D 53/12; B21H 1/12; B21K 1/02
[52] U.S. Cl. ............................... 29/148.4 D; 29/456; 29/127; 29/521; 29/522 R; 138/150
[58] Field of Search ................... 29/521, 456, 148.4 D, 29/522, 127; 138/150, 154

[56] References Cited

U.S. PATENT DOCUMENTS

| 2,050,993 | 8/1936 | Bush ..................................... 29/521 |
| 3,679,531 | 7/1972 | Wienand et al. ................. 138/154 X |
| 3,981,059 | 9/1976 | Dodson ................................ 29/157 |

FOREIGN PATENT DOCUMENTS

| 756,783 | 6/1953 | Fed. Rep. of Germany ............. 29/521 |
| 2,545,146 | 9/1974 | Fed. Rep. of Germany ............. 29/127 |

*Primary Examiner*—Charlie T. Moon

*Attorney, Agent, or Firm*—Steinberg & Blake

[57] ABSTRACT

A strip-covered roll and the method for manufacturing the same, according to which the roll includes an inner roll body and a plurality of circumferential strip portions surrounding and engaging the inner roll body so as to cover the latter, these circumferential strip portions also engaging each other and being distributed axially along the inner roll body. Each circumferential strip portion has on one side a circumferential groove and on the other side an integral circumferential projection, and the projection of one circumferential strip portion is received in and fills the groove of the next circumferential strip portion, the groove having in its interior a greater transverse dimension than at the side surface of each circumferential strip portion which is formed with the groove, so that in this way the circumferential strip portions are locked to each other. According to the method, the circumferential projection of each circumferential strip portion is initially of a configuration enabling it to enter into the groove of the next circumferential strip portion, and when these strip portions are pressed against each other the circumferential projection is deformed so as to fill the groove and provide the interlock.

6 Claims, 5 Drawing Figures

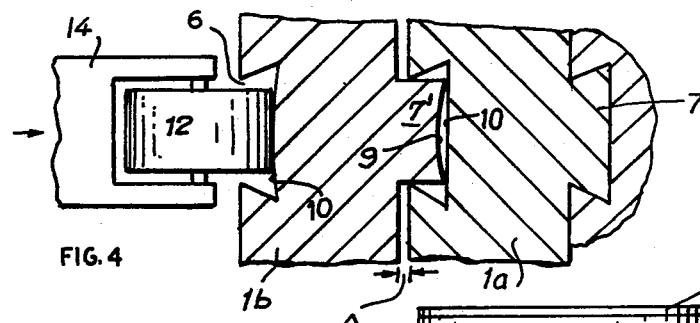
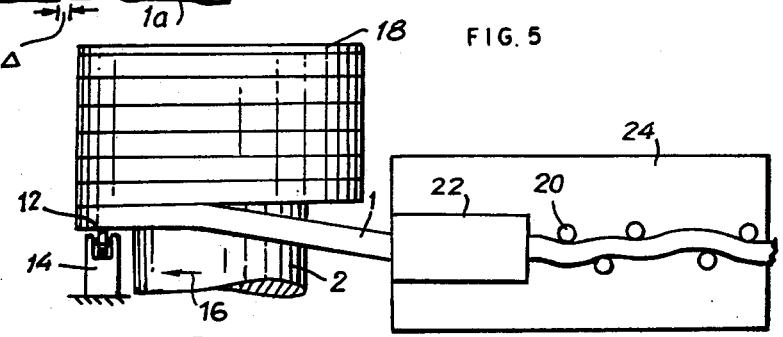
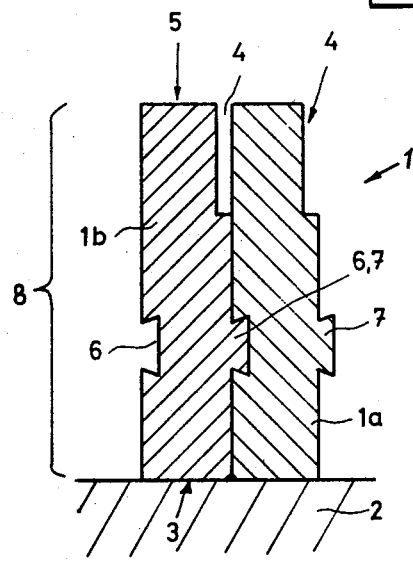
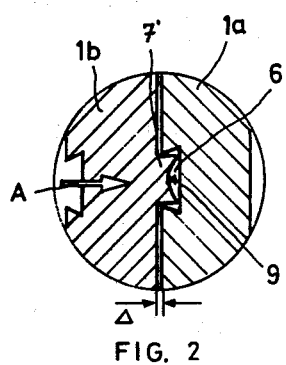
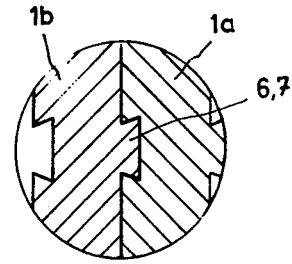

METHOD OF MAKING STRIP-COVERED ROLL

BACKGROUND OF THE INVENTION

The present invention relates to strip-covered rolls, of the type suitable for use in paper machines, and to methods for manufacturing such rolls.

Thus, the present invention relates to a method for locking or securing the covering strip of a grooved and/or ungrooved roll of the type which can be used in a paper machine, particularly when the covering is composed of a covering strip or strips which are helically wound onto an inner roll body, which may be solid or hollow.

Thus, the present invention relates to a roll capable of being used in a paper machine and having a covering which preferably is resistant to corrosion and which may be alternately grooved or ungrooved over its exterior surface, or which is made of grooved and ungrooved sections situated one beside the other along the axis of the roll.

Roll coverings made of a continuous covering strip, by winding the latter upon a roll body or the equivalent thereof are already known. For example reference may be made to U.S. Pat. No. 3,718,959, in this connection.

As was well known, where an inner roll body is covered with a series of circumferential strip portions which may take the form of consecutive turns of a continuous covering strip, it is important to interlock and secure the successive circumferential strip portions or convolutions reliably to each other. Otherwise these strip portions, made of stainless steel, for example, will have a tendency to move one with respect to the other in a highly undesirable manner.

SUMMARY OF THE INVENTION

It is accordingly a primary object of the present invention to provide a method and roll structure where a strip-covering has successive circumferential portions thereof reliably interlocked.

It is furthermore an object of the present invention to provide a method which is exceedingly simple to carry out.

Furthermore, it is an object of the present invention to provide a method according to which the interlocking of successive circumferential strip portions is carried out simultaneously with the winding of a continuous strip onto an inner roll body to form thereon the circumferential strip portions.

A particular object of the present invention is to provide a roll covering where the circumferential strip portions which constitute the covering cannot be separated without deforming the circumferential strip portions.

BRIEF DESCRIPTION OF DRAWINGS

The invention is illustrated by way of example in the accompanying drawings which form part of this application and in which:

FIG. 1 is a schematic fragmentary sectional illustration of an embodiment of a roll of the invention manufactured according to the method of the invention, the section of FIG. 1 being taken in a plane which contains the roll axis;

FIG. 2 is a fragmentary schematic sectional illustration of a preliminary stage in the manufacture of the structure of FIG. 1;

FIG. 3 shows the structure resulting from the method illustrated in FIG. 2;

FIG. 4 is a fragmentary sectional illustration illustrating further details of a method and structure of the invention; and FIG. 5 is a schematic top plan view of a method of manufacture according to the invention.

DESCRIPTION OF PREFERRED EMBODIMENTS

Referring now to FIG. 1, there is fragmentarily and schematically illustrated therein a roll covering 8 which in the illustrated example is in the form of an elongated strip 1 of suitable profile which is helically wound onto an inner roll body 2, so as to provide in this way consecutive turns or circumferential portions 1a, 1b, etc. The continuous strip is helically wound onto the inner roll body in such a way that the consecutive circumferential portions thereof press tightly against each other and also press against the exterior surface of the inner roll body 2. In the particular example illustrated the strip 1 is formed in one of its side faces adjacent its outer periphery with a continuous shoulder which provides between the successive circumferential strip portions the circumferential groove portions 4 which of course form part of a continuous helical groove at the exterior of the illustrated roll. However, it is to be understood that the shoulder which forms the groove 4 need not be provided, and in such case the roll will have a continuous uninterrupted exterior surface formed by the outer peripheral surfaces 5 of the several circumferential strip portions 1a, 1b, etc. However, in either event the inner peripheral surfaces 3 of the several circumferential strip portions will directly engage and press against the exterior surface of the inner roll body 2.

As is apparent from FIGS. 1–3, the profile of the strip 1 is such that it has between the exterior surface of the roll body 2 and the outer peripheral surface 5 an elongated groove 6 which thus provides each circumferential strip portion with such a circumferential groove on one side surface thereof, namely the left side surface, as viewed in the drawings. In the illustrated example the groove 6 is shown as being of a dovetail cross section, but any groove of inwardly expanding cross section can be utilized. Thus the groove 6 should have inwardly of the side surface of the strip portion in which it is formed a radial dimension, with respect to the axis of the roll body 2, which is greater than at the side surface itself, namely at the left side surface of each circumferential strip portion, as viewed in FIG. 1.

Furthermore, the profile of the strip 1 is such that at the several circumferential strip portions there will be in circumferential alignment with the groove 6 a circumferential projection 7 which initially has the configuration 7' indicated in FIG. 2, so that the projection 7' of one circumferential strip portion can without difficulty enter into the groove 6 of the next circumferential strip portion. Thus, as is apparent from FIG. 2, initially the circumferential projection 7' has inner and outer circumferential surfaces spaced from each other by a radial distance which is slightly less than the radial dimension of the narrowest part of the groove 6. These inner and outer circumferential surface portions of the integral projection 7' initially may extend perpendicularly from a side surface of each strip portion. Moreover, each integral circumferential projection 7' of each strip portion initially has a circumferential end surface 9 which is concave as indicated in FIG. 2. As a result the end surface 9 will terminate in inner and outer circumferential edges which are relatively sharp as is apparent from FIG. 2.

The dimension of the projection 7' is such that when entering a groove 6 the opposed circumferential edges of the surface 9 will initially engage the next strip portion 1a, as seen in FIG. 2, at the inner surface of the groove 6. When the circumferential projection 7' is thus initially received in the groove 6, the projection and groove cooperate to provide between the successive strip portions the gap Δ indicated in FIG. 2. However, by providing the pressure as indicated by the arrow A in FIG. 2, the gap Δ will be eliminated and at the same time the projection 7' will be deformed to fill the groove 6, in the manner indicated in FIG. 3, as well as FIG. 1, so that when the successive circumferential strip portions press against each other the grooves 6 are respectively filled with the dovetail projections 7, thus achieving a reliable interlock.

Thus, with the above method a permanent locking is obtained, and it is only possible to undo the interlock by utilizing an extremely large force which will of course be sufficient to provide deformation in order to achieve the unlocking of the successive circumferential strip portions from each other.

Thus, as is apparent from a comparison of FIGS. 2 and 3, initially the inner and outer marginal portions of the end 9 of the projection 7' are spread apart from each other while engaging the bottom or inner surface of the groove 6, and because of the shape of the concave end shape 9 it is possible for the projection 7' to be deformed so as to provide the structure shown in FIGS. 1 and 3.

A method according to the invention is illustrated in greater detail in FIG. 4 which illustrates an embodiment according to which the profiled strip 1 initially has at its groove 6 an inner surface 10 which is convex in the manner apparent from the circumferential strip portion 1b of FIG. 4. The pressure may be applied by way of a suitable roller 12 connected, for example, to a piston rod 14 which projects from a piston of a suitable hydraulic assembly capable of providing the force required to deform the circumferential projection 7' so that it will fill the groove 6. Thus it will be seen that the groove 6 of the circumferential strip portion 1a already has an inner flat surface 10 resulting from placing of the circumferential projection 7 of the strip portion 1a in the preceding circumferential portion which is fragmentarily illustrated in FIG. 4.

FIG. 5 shows schematically, in a plan view, how the inner roll body 2 is rotated about its axis, in the direction of the arrow 16. Thus this roll body 2 may be mounted on a suitable lathe so as to be rotated about its axis and is initially provided with an end ring 18 which is fixed to the body 2 and to which one end of the profiled strip 1 is fixed in a well known manner. Then as the body 2 is driven in rotation it will pull the strip 1 from any suitable force through a series of straightening rollers 20 through a suitable frictional braking device 22 so as to provide a desired tension in the strip 1 while it is helically wound on the inner roll body 2 in the manner indicated in FIG. 5. FIG. 5 also schematically illustrates the piston portion 14 which carries the pressure roller 12 which is situated in the circumferential groove 6 in the manner shown schematically in FIGS. 4 and 5. Of course other conventional pressure rolls may be utilized to press the successive convolutions or circumferential portions of the strip against each other. The hydraulic means 14, which supports and presses the pressure roll 12 may be mounted on a carriage 24 which in a known way moves at a predetermined rate which will provide the windings as illustrated in FIG. 5, this carriage 24 of course also carrying the braking device 24 and the straightening rolls 20.

Of course, the invention is not to be narrowly confined to the details shown in the drawings and described above only by way of example. The details of the invention may of course vary within the inventive concept defined by the claims which follow.

What is claimed is:

1. A method of manufacturing a roll of the type suitable for use in a paper machine, comprising the steps of successively surrounding an inner roll body with a plurality of circumferential strip portions which engage an exterior surface of the inner roll body to cover the latter at said exterior surface thereof, so that said circumferential strip portions become situated on said roll body one after the other while being distributed axially along said inner roll body, each circumferential strip portion being formed at one circumferential side surface thereof with a groove situated between inner and outer edges of said one side surface and each circumferential strip portion having at an opposed side surface thereof in circumferential alignment with said groove an integral circumferential projection of predetermined cross-sectional configuration, said groove of each circumferential strip portion having at said one side surface thereof a radial dimension with respect to the axis of said inner roll body which is smaller than a radial dimension of said groove in the interior thereof spaced from said one side surface of each circumferential strip portion, and the radial dimension of said circumferential projection of each strip portion initially being small enough for each circumferential strip portion to enter into the groove of an adjoining strip portion while initially engaging said adjoining strip portion in the interior of said groove thereof in a manner preventing said adjoining strip portion from engaging at said one side surface thereof the adjoining side surface of the circumferential strip portion whose projection is received in said groove of said adjoining strip portion, so that initially there is a gap between adjoining strip portions at said side surfaces thereof, and pressing said adjoining strip portions into engagement with each other at said adjoining side surfaces thereof while simultaneously deforming said projection to fill said groove, so as to interlock adjoining strip portions.

2. A method as recited in claim 1 and wherein the pressing of the adjoining strip portions against each other takes place in the interior of the groove of one strip portion in a manner deforming the integral projection of said one strip portion for filling the groove of the adjoining strip portion.

3. A method as recited in claim 1 and wherein the circumferential projection of each strip portion initially has outer and inner circumferential surfaces spaced from each other by a distance which is only slightly less than the radial dimension of each groove at the side surface of each circumferential strip portion which is formed with said groove, and said inner and outer circumferential surfaces of each projection extending substantially perpendicularly from said opposed side surface of each circumferential strip portion.

4. A method as recited in claim 3 and wherein each circumferential projection of each circumferential strip portion has a concave circumferential end surface extending between said inner and outer circumferential surfaces thereof and terminating at said inner and outer circumferential surfaces of each projection in a pair of relatively sharp circumferential edges which initially engage an inner surface of a groove of the adjoining circumferential strip portion and which then become spread apart from each other during said pressing step.

5. A method as recited in claim 4 and wherein each groove initially is of a substantially dovetail cross section while each projection becomes deformed into the dovetail cross section of said groove.

6. A method as recited in claim 1 and wherein said circumferential strip portions all form part of a continuous strip which is helically wound onto said inner roll body.

* * * * *